United States Patent [19]

Godfrey

[11] 4,076,670

[45] Feb. 28, 1978

[54] HOT-MELT ADHESIVES HAVING IMPROVED PROPERTIES AT ELEVATED TEMPERATURES

[75] Inventor: Darryl A. Godfrey, Longview, Tex.

[73] Assignee: Eastman Kodak Company, Rochester, N.Y.

[21] Appl. No.: 763,266

[22] Filed: Jan. 27, 1977

[51] Int. Cl.$^2$ .............................................. C08L 93/00
[52] U.S. Cl. .............................. 260/27 R; 260/897 A
[58] Field of Search .......................... 260/27 R, 897 A

[56] References Cited

U.S. PATENT DOCUMENTS

| 3,478,131 | 11/1969 | Wharton et al. ................ 260/897 A |
| 3,492,372 | 1/1970 | Flanagan ....................... 260/27 R X |
| 3,846,349 | 11/1974 | Harada et al. ............... 260/897 A X |
| 4,022,728 | 5/1977 | Trotter et al. ..................... 260/27 R |

Primary Examiner—Lewis T. Jacobs
Attorney, Agent, or Firm—Clyde L. Tootle; Daniel B. Reece, III

[57] ABSTRACT

The hot melt adhesives of the present invention comprise a blend of polyethylene, tackifying resin, and crystalline propylene containing polymer. These hot melt adhesive compositions have a novel combination of properties including high strength at elevated temperatures and pressures and resistance to creep.

21 Claims, No Drawings

HOT-MELT ADHESIVES HAVING IMPROVED PROPERTIES AT ELEVATED TEMPERATURES

This invention relates to hot melt adhesive compositions having a novel combination of properties. More specifically, the invention relates to hot melt adhesive compositions having high strength at elevated temperatures and pressures and good resistance to creep.

Hot melt adhesives produce a bond by mere cooling as distinguished from crosslinking or other chemical reactions. Prior to heating, the hot melt adhesives are solids that can be prepared in bulk or pellet form for ease of handling. Upon heating, the hot melt adhesive composition melts and flows freely for application to a substrate. Since the hot melt adhesives of the present invention are thermoplastic rather than thermosetting, and thus remeltable, they can be applied to a particular substrate and later remelted to form a hot melt bond between this substrate and another substrate.

Hot melt adhesives are useful for bonding various substrates together such as wood, paper, plastics, and textiles, as well as other materials. One use for which they are well suited is the fabrication of corrugated paperboard, and for cardboard case sealing and closing. Hot melt adhesives useful for producing corrugated paperboard must have high bond strength under conditions of shock, stress, high humidity and extremes of temperature encountered in transportation and storage. In addition, the melt point, wetting time, initial tack, setting time, pot life and general handling qualities on automatic corrugated board machinery are essential considerations.

Hot melt adhesives are widely used by industry in the construction of various packaging containers. For example, one application is the use of hot melt adhesives as the side seam adhesive in the preparation of cans from fibrous materials which may have a metal or plastic foil laminate. Although prior hot melt adhesives are useful for many applications, they do not have the strength at elevated temperatures or resistance to creep necessary for some packaging applications. Prior polyolefin based hot melt adhesives also do not have the adhesive properties at the pressures and temperatures of the adhesives of the present invention. Therefore, it would be an advance in the state of the art to provide polyolefin based hot melt adhesives that have high strength at elevated temperatures and pressures and resistance to creep.

In accordance with the present invention, I have found that a blend comprising low density polyethylene, tackifying resin, and crystalline polypropylene or crystalline propylene containing copolymer, provides a hot melt adhesive having a novel combination of properties including good resistance to creep. The use of large amounts of crystalline polypropylene or crystalline propylene containing copolymer to improve elevated temperature flow resistance is a novel approach to formulating pressure and heat resistant hot melt adhesives. Crystalline polypropylene or crystalline propylene containing copolymer is very difficult to use in large amounts in hot melt adhesives as it normally has poor adhesive properties and does not adhere well to many substrates. The principal prior use of crystalline polypropylene or crystalline propylene containing copolymer has been in small amounts in adhesives containing amorphous propylene containing polymers. The small amounts of crystalline polypropylene or crystalline propylene containing copolymer tend to raise the ring and ball softening points of such adhesives, but larger amounts tend to reduce surface tack and increase melt viscosity. The compositions of this invention show however that pressure and heat resistant hot melt adhesive formulations containing large amounts of crystalline polypropylene or crystalline propylene containing copolymer can be formulated for uses such as on paper or fibrous substrates.

The low density polyethylenes useful in the present invention are well known in the art and can be prepared by the high pressure polymerization of ethylene in the presence of free radical catalysts. These polyethylenes have a melt index at 190° C. of about 1 to about 50, preferably about 10 to 30, and most preferably about 20. These polyethylenes have a density of about 0.910 g/cm$^3$ to about 0.940 g/cm$^3$, preferably about 0.920 g/cm$^3$ to about 0.930 g/cm$^3$, and most preferably about 0.925 g/cm$^3$. Examples of commercially available polyethylenes useful in this invention are low density polyethylene available from Eastman Chemical Products, Inc. These polyethylenes can be used in amounts of about 30 percent to about 70 percent by weight, preferably about 35 percent to about 45 percent by weight.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. Once such hydrocarbon tackifying resin is a hydrocarbon resin having a softening point of 130° C. and available commercially as Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. Examples of such commercially available resins of this type are "Wingtack" resins sold by the Goodyear Tire and Rubber Company and the "Sta-Tac", "Nirez" and "Betaprene H" resins sold by the Reichhold Chemical Corporation.

Also other suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Other suitable tackifying resins are the rosin esters which include ethylene glycol, polyethylene glycol, glycerol and pentaerythritol rosin esters, hydrogenated rosin esters or methylated rosin esters, for example, the commercially available materials "Staybelite" Ester 3, triethylene glycol ester of hydrogenated rosin, "Foral" 85 and 105, highly stabilized ester resins of pentaerythritol and rosin base.

The hydrocarbon resins, polyterpenes, and rosin esters can be used either alone or in combinations; however, in general, the better results have been obtained with the hydrocarbon resins used alone. These tackifying resins, which preferably have softening points of at least 100° C. and most preferably at least 120° C., can be used in amounts of about 10 percent to about 50 percent by weight of the adhesive composition, preferably about 20 percent to about 40 percent by weight and most preferably about 30 percent by weight.

The crystalline, hexane insoluble polypropylenes or propylene containing copolymers useful in the adhesive compositions of this invention are produced by the polymerization of propylene or propylene and ethylene in the presence of stereospecific catalysts. One method for preparing these polypropylenes or propylene containing copolymers is disclosed in U.S. Pat. No. 3,679,775. These polypropylenes or propylene containing copolymers are predominantly crystalline, i.e., hexane insoluble; however, they may contain a small amount of amorphous polymer, i.e., hexane soluble polymer in an amount up to about 10 percent by weight of the crystalline polymer. The crystalline propylene containing copolymers are crystalline ethylene/propylene copolymers containing not more than 20 percent by weight ethylene. These polypropylenes and crystalline propylene containing copolymers have flow rates at 230° C. of about 30 to 180, preferably about 120 to about 180. These crystalline polypropylenes and propylene containing copolymers can be used in amounts of about 10 percent to about 40 percent by weight of the adhesive composition, preferably about 25 percent to about 35 percent by weight, and most preferably about 30 percent by weight.

The adhesive compositions of this invention are prepared by blending together the components in the melt at a temperature of about 180° to about 230° C. until a homogeneous blend is obtained, approximately 2 hours. Various methods of blending materials of this type are known to the art and any method that produces a homogeneous blend is satisfactory. These components blend easily in the melt and a heated vessel equipped with a stirrer is all that is required. For example, a Cowles stirrer provides an effective mixing means for preparing these hot melt adhesive compositions.

In addition to the above listed components, it is desirable for the hot melt adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, "Ionox" 220 and 330 [tris(di-t-butyl-p-hydroxybenzyl)-trimethylbenzene], "Dalpac" 4C2 [6-di(t-butyl)-p-cresol], "Naugawhite" (alkylated bisphenol), "Butyl Zimate" (zinc dibutyl dithiocarbamate), and "Ethyl" 702 [4,4'-methylene bis(2,6-di-tert-butylphenol)]. A particularly effective antioxidant is Irganox 1010 which is identified as tetrakis[methylene-3-(3',5'-di-t-butyl-4'-hydroxyphenyl)propionate] methane when used in combination with Cyanox 1212 (American Cyanamid) which is laurylstearyl thiodipropionate.

Adhesive properties are determined as follows:

Viscosity Determination

Viscosity of the adhesives was determined at 190° C. on an F. F. Slocomb Melt Viscometer.

Creep Resistance

A sheet of fiberboard substrate was wound around a mandrel having a diameter of about 2.5 inches into the shape of a cylinder with an overlap of 0.3 inch. The cylinder was lap shear bonded with the adhesive to be evaluated. This sample was then marked with a pencil along the bond. The sample was put into a cold box at 35° F. for 24 hours at which time the bond was inspected for creep. If the bond edge still matched up with the pencil mark, no bond creep had been experienced. Samples prepared in this way were also used to test for bond failure at 0° F. after 1 hour exposure.

Bond Strength at Elevated Temperature

1. Samples (1/2 inch wide) of the fiberboard substrates are bonded with the adhesive by applying it with a heated spatula. An overlapping bond of 0.3 inch is made. Thus, the bond area is 0.5 inch × 0.3 inch.

2. Bonds are allowed to condition at room temperature for 24 hours.

3. The bond strength of the adhesive is determined by separating the bond at 0.1 inch/minute on an Instron tensile tester. A jaw separation distance of approximately 0.7 inch is used. A temperature cabinet is used to determine bond strength at various temperatures.

Identification of the various components used in the following examples are as follows:

Resin H-138 — DAC-B Hydrocarbon Resin having a Ring and Ball Softening Point of 138° C. and Density of 1.04 g/cm$^3$ Tenite 428S — Crystalline Polypropylene having a Melt flow rate at 230° C. of 160 and Density of 0.905 g/cm$^3$ Tenite 18BO — Polyethylene having a Density of 0.925 g/cm$^3$ and a Melt Index at 190° C. of 20

Cyanox 1212 — Laurylstearylthio-dipropionate

Irganox 1010 — [Methylene 3-(3',5'-di-tertiary-butyl-4'-hydroxyphenyl)-propionate] methane Dexon 1001 — Propylene-acrylic Acid Graft Copolymer having a Melt Index at 190° C. of approximately 20 and Density of 0.92 g/cm$^3$ Dexon 1002 — Ethylene-acrylic Acid Graft Copolymer having a Melt Index at 190° C. of 25 and Density of 0.92 g/cm$^3$ Dexon XPA-3 — Ethylene-propylene-acrylic Acid Graft Terpolymer having a Melt Index at 190° C. of 5 and Density of 0.91 g/cm$^3$ SE-153 — Ethylene-propylene Block Copolymer (Hercules) having a Melt Flow Rate at 230° C. of 1.6 and Density of 0.905 g/cm$^3$ Paraflint RG — Synthetic Fisher-Tropsch Wax having a Melting Point of 214° F. and Viscosity at 250° F. of 9.5 cp Vistalon 702 — Ethylene-propylene Rubber having a Specific Gravity of approximately 0.86 and Melt Flow Rate at 230° C. of approximately 1.0

Indopol H-1900 — Polyisobutylene having a Molecular Weight of 2300; Flash Point of 490° F.; and Specific Gravity of 0.907

Nirez 1135 — Polyterpene Resin having a Ring and Ball Softening Point of 135° C. and Density of 0.995 g/cm$^3$ AMP — Amorphous Polypropylene having a Specific Gravity of 0.86 and Softening Point of 105° C.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

The following adhesive composition was prepared:

| | |
|---|---|
| 29.55 Percent | DAC-B Hydrocarbon Resin, Hydrocarbon Resin having a Softening Point of 100° C., and a viscosity of 140 centipoise at 190° C. and a Ring and Ball Softening Point of 138° C. (Resin H-138) |
| 30 Percent | Crystalline Polypropylene having a Melt Flow Rate at 230° C. of 160 and a Density of 0.905 (Tenite 4285) |
| 40.0 Percent | Polyethylene having a Melt Index at 190° C. of 20 and a Density of 0.925 g/cm³ (Tenite 18BO) |
| 0.10 Percent | Tetrakis[methylene-3-(3',5'-di-t-butyl-4'-hydroxyphenyl)propionate]methane (Irganox 1010) |
| 0.35 Percent | Laurylstearylthio-dipropionate (Cyanox 1212) |

This composition provided an adhesive composition with the following properties:

| | |
|---|---|
| Melt Viscosity at 190° C., cps | 120,000 |
| Ring and Ball Softening Point, ° C. | 159 |
| Creep at 35° F. After 24 Hours | None Detectable |
| Bond Strength at - 73° F. | 88 psi |
| 105° F. | 77 psi |
| 140° F. | 57 psi |

This shows that this adhesive has excellent resistance to elevated temperature and pressure.

EXAMPLE 2

Example 1 was repeated with the exception that a crystalline ethylene/propylene copolymer containing 1.4 weight percent ethylene having a melt flow rate at 230° C. of 120 was substituted for crystalline polypropylene. The properties of this adhesive composition were essentially identical to those of the composition of Example 1.

EXAMPLE 3

Example 1 was repeated with the exception that Nirez 1135 was substituted for Resin H-138. The properties of this adhesive composition were essentially identical to those of the composition of Example 1.

EXAMPLE 4

The following adhesive composition was prepared:
29.55% Resin H-138
20.0% Tenite 428S
50.0% Tenite 18BO
0.35% Cyanox 1212
0.10% Irganox 1010

This composition resulted in an adhesive with the following properties:

| | |
|---|---|
| Melt Viscosity at 190° C., cps | 125,000 |
| Ring and Ball Softening Point, ° C. | 155 |
| Creep at 35° F. After 24 Hours | None Detectable |
| Bonded Strength at - 73° F. | 90 psi |
| 105° F. | 74 psi |
| 140° F. | 51 psi |

This adhesive composition shows the relationship between bond strength at elevated temperatures and crystalline polypropylene content of adhesive, i.e., as crystalline polypropylene content decreases the bond strength at elevated temperatures decreases.

EXAMPLE 5

The following adhesive composition was prepared:
29.55% Resin H-138
70.0% Tenite 18BO
0.35% Cyanox 1212
0.10% Irganox 1010

This composition resulted in an adhesive with the following properties:

| | |
|---|---|
| Melt Viscosity at 190° C., cps | 135,000 |
| Ring and Ball Softening Point, ° C. | 128 |
| Creep at 35° F. After 24 Hours | None Detectable |
| Bonded Strength at - 73° F. | 64 psi |
| 105° F. | 51 psi |
| 140° F. | 45 psi |

This adhesive composition shows the effect of deleting the crystalline polypropylene from the adhesive composition.

EXAMPLE 6

The following adhesive compositions were prepared:

| Run Number Component | 1 Wt. % | 2 Wt. % | 3 Wt. % | 4 Wt. % | 5 Wt. % | 6 Wt. % | 7 Wt. % |
|---|---|---|---|---|---|---|---|
| Resin H-138 | 29.55 | 29.55 | 29.55 | 29.55 | 29.55 | 29.55 | 29.55 |
| Antioxidants | 0.45 | 0.45 | 0.45 | 0.45 | 0.45 | 0.45 | 0.45 |
| Tenite 18BO | 35 | 35 | 35 | 35 | 50 | 30 | — |
| Dexon 1002 | 35 | — | — | — | — | — | — |
| Dexon 1001 | — | 35 | — | — | — | — | — |
| Dexon XPA-3 | — | — | 35 | — | — | — | — |
| SE-153 | — | — | — | 35 | — | 30 | — |
| Paraflint RG | — | — | — | — | 10 | 10 | — |
| Vistalon 702 | — | — | — | — | 10 | — | — |
| AMP | — | — | — | — | — | — | 25 |
| Tenite 428S | — | — | — | — | — | — | 25 |
| Indopol H-1900 | — | — | — | — | — | — | 25 |

All these adhesive compositions had bond strengths of less than 30 psi at room temperatures. These adhesives would obviously fail at elevated temperatures of 105° F. and 140° F.

Although the invention has been described in considerable detail with particular reference to certain preferred embodiments thereof, variations and modifications can be effected within the spirit and scope of the invention.

I claim:

1. An adhesive composition capable of being used as a hot melt adhesive comprising a blend of
   (1) 30 to 70 weight percent polyethylene having a melt index at 190° C. of about 1 to about 50 and a density of about 0.910 g/cm³ to about 0.940 g/cm³
   (2) 10 to 50 weight percent of at least one tackifying resin selected from the group consisting of hydrocarbon resins, polyterpene resins, and rosin esters, and
   (3) 10 to 40 weight percent crystalline polypropylene or crystalline propylene/ethylene copolymers containing not more than 20 percent by weight ethylene having a melt flow rate at 230° C. of 30 to 180.

2. An adhesive composition according to claim 1 wherein said polyethylene has a melt index at 190° C. of about 1 to about 50 and a density of about 0.920 g/cm³ to about 0.930 g/cm³.

3. An adhesive composition according to claim 2 wherein said tackifying resin is hydrocarbon resin having a softening point of at least 100° C.

4. An adhesive composition according to claim 2 wherein said tackifying resin is a polyterpene resin having a softening point of at least 100° C.

5. An adhesive composition according to claim 2 wherein said crystalline polypropylene or crystalline propylene/ethylene copolymers containing not more than 20 percent ethylene by weight has a melt flow rate at 230° C. of 120 to 180.

6. An adhesive composition capable of being used as a hot melt adhesive comprising a blend of
   (1) 35 to 45 weight percent polyethylene having a melt index at 190° C. of about 10 to about 30 and a density of about 0.920 g/cm³ to about 0.930 g/cm³,
   (2) 20 to 40 weight percent of at least one tackifying resin selected from the group consisting of hydrocarbon resins, polyterpene resins, and rosin esters having a ring and ball softening point of at least 100° C., and
   (3) 25 to 35 weight percent crystalline polypropylene having a melt flow rate at 230° C. of 30 to 180.

7. An adhesive composition according to claim 6 wherein said tackifying resin is hydrocarbon resin having a softening point of at least 120° C.

8. An adhesive composition according to claim 6 wherein said tackifying resin is a polyterpene resin having a softening point of at least 120° C.

9. An adhesive composition according to claim 6 wherein said crystalline polypropylene has a melt flow rate at 230° C. of 120 to 180.

10. An adhesive composition capable of being used as a hot melt adhesive comprising a blend of
    (1) 35 to 45 weight percent polyethylene having a melt index at 190° C. of about 20 and a density of about 0.925 g/cm³,
    (2) 30 weight percent of at least one tackifying resin selected from the group consisting of hydrocarbon resins, polyterpene resins, and rosin esters having a ring and ball softening point of at least 100° C., and
    (3) 25 to 35 weight percent crystalline polypropylene having a melt flow rate at 230° C. of 30 to 180.

11. An adhesive composition according to claim 10 wherein said tackifying resin is hydrocarbon resin having a softening point of at least 120° C.

12. An adhesive composition according to claim 10 wherein said tackifying resin is a polyterpene resin having a softening point of at least 120° C.

13. An adhesive composition according to claim 10 wherein said crystalline polypropylene has a melt flow rate at 230° C. of 120 to 180.

14. An adhesive composition capable of being used as a hot melt adhesive comprising a blend of
    (1) 35 to 45 weight percent polyethylene having a melt index at 190° C. of about 10 to about 30 and a density of about 0.920 g/cm³ to about 0.930 g/cm³,
    (2) 20 to 40 weight percent of at least one tackifying resin selected from the group consisting of hydrocarbon resins, polyterpene resins, and rosin esters having a ring and ball softening point of at least 100° C., and
    (3) 25 to 35 weight percent crystalline ethylene/propylene copolymer containing 1.4 weight percent ethylene having a melt flow rate at 230° C. of 30 to 180.

15. An adhesive composition according to claim 14 wherein said tackifying resin is hydrocarbon resin having a softening point of at least 120° C.

16. An adhesive composition according to claim 14 wherein said tackifying resin is a polyterpene resin having a softening point of at least 120° C.

17. An adhesive composition according to claim 14 wherein said crystalline ethylene/propylene copolymer containing 1.4 weight percent ethylene has a melt flow rate at 230° C. of 120 to 180.

18. An adhesive composition capable of being used as a hot melt adhesive comprising a blend of
    (1) 35 to 45 weight percent polyethylene having a melt index at 190° C. of about 20 and a density of about 0.925 g/cm³,
    (2) 30 weight percent of at least one tackifying resin selected from the group consisting of hydrocarbon resins, polyterpene resins, and rosin esters having a ring and ball softening point of at least 100° C., and
    (3) 25 to 35 weight percent crystalline ethylene/propylene copolymer containing not more than 20 weight percent ethylene having a melt flow rate at 230° C. of 30 to 180.

19. An adhesive composition according to claim 18 wherein said tackifying resin is hydrocarbon resin having a softening point of at least 120° C.

20. An adhesive composition according to claim 18 wherein said tackifying resin is a polyterpene resin having a softening point of at least 120° C.

21. An adhesive composition according to claim 18 wherein said crystalline ethylene/propylene copolymer containing 1.4 weight percent ethylene has a melt flow rate at 230° C. of 120 to 180.

* * * * *